HYBRID TERMINATION SWITCH RESPONSIVE TO RINGING SIGNAL

Filed Nov. 22, 1965

INVENTORS:
COSBY A. DRAPER, JR.
WALTER L. GALLION,

BY D. David Blumenfeld
THEIR ATTORNEY.

United States Patent Office 3,428,755

Patented Feb. 18, 1969

3,428,755

HYBRID TERMINATION SWITCH RESPONSIVE TO RINGING SIGNAL

Cosby A. Draper, Jr., and Walter L. Gallion, Lynchburg, Va., assignors to General Electric Company, a corporation of New York Filed Nov. 22, 1965, Ser. No. 508,926

U.S. Cl. 179—84 8 Claims

Int. Cl. H04m *1/76*

ABSTRACT OF THE DISCLOSURE

An electrically controlled switch, responsive to ringing signal, which terminates the two and four-wire lines while maintaining the proper impedance balance and signal isolation.

This invention relates to a signalling arrangement for a communication system and, more particularly, to one adapted to maintain the proper operating conditions and signal circuit isolation during signalling.

In "ringdown" signalling arrangements, a continuous or pulsed AC signal is transmitted over a communication line or other transmission medium from the calling station or subset to the called station or subset. During "ringdown" signalling, difficulties are often encountered in maintaining proper operation of the line terminating equipment which couples the four-wire send/receive lines to a two-wire line.

Such terminating sets include a hybrid arrangement for terminating the two and four-wire lines while maintaining the proper impedance balance and signal isolation for optimum system operation. A hybrid is a bridge circuit or connecting device (either of the resistive or transformer type) that combines the functions of providing impedance matching between certain circuits and signal isolation between other circuits. Thus, the hybrid is used in four-wire terminating set to connect a four-wire line to a two-wire line so that both directions of transmission, i.e., send and receive, on the four-wire line are isolated from each other, but are connected to the two-wire line leading, for example, to the subscriber's subset. A simple hybrid thus has four sets of terminals, one set connected to a two-wire line which is connected to the subset, two sets of terminals connected to the send and receive sections of the four-wire (which may, in turn, be connected to one channel of a frequency-division multiplex carrier system, for example) and one set connected to a network adjusted or designed to simulate the impedance of the two-wire line to maintain the desired impedance match and enhance the isolation between the send and receive sections. The degree to which this impedance is simulated is known as the hybrid balance, and it is here that difficulties arise during the "ringdown" signalling.

During "ringdown," a low-frequency ringing voltage (20 cycles, for example) is applied from the subscriber's subset to the two-wire line, and is utilized to actuate ringing circuitry which applies a higher-frequency AC signal (3825 cycles, for example), to the carrier multiplex equipment or the communication line for transmission to the remote called station. It is obvious, therefore, that the low-frequency 20-cycle signal should not be applied to the four-wire send line.

Since one set of hybrid terminals is connected to the two-wire line, the 20-cycle ringing voltage on the two-wire line will be transmitted over the send line unless some means is provided for interrupting the two-wire audio line from the subscriber subset to the hybrid during "ringdown."

Some means must, therefore, be provided for automatically opening the two-wire audio transmission path to the hybrid in order to prevent the 20-cycle ringing voltage from being transmitted. However, merely providing an electrically-controlled network which will open the audio line upon appearance of the 20-cycle ringing voltage is not enough, for while it may solve one problem, that of eliminating the transmission of the ringing voltage, it introduces another problem. By merely opening the audio line, the hybrid balance of the terminating hybrid is destroyed, since the set of hybrid terminals normally connected to the two-wire line no longer has the proper impedance coupled thereto. With this loss of hybrid balance, the return loss characteristics of the hybrid (which may be defined as the signal loss between the send and receive terminal of the hybrid) is reduced sufficiently to cause acoustic feedback or "singing" between the send and receive lines. If the line (and this includes both the receive, send, and two-wire line) and the hybrid balancing network are perfectly matched, the hybrid return loss is infinite and no signal transmission exists across the hybrid. However, if this balance is not perfect, there is some finite value of return loss between send and receive lines which, depending on the circuit design, provides a predetermined amount of signal circuit isolation. Removal of the two-wire audio line from the hybrid, however, can seriously affect the hybrid balance so that there is a substantial transmission of energy between the receive and send circuits of the four-wire line. This, of course, produces feedback and self-oscillation, which is customarily referred to in this art as "singing." Therefore, some additional means must be provided for properly terminating the hybrid terminal set normally connected to the two-wire line by switching a suitable termination impedance into the circuit whenever the two-wire audio line is interrupted during application of the 20-cycle ringing voltage. Furthermore, if the hybrid is to be so terminated through an electrically controlled switching network, care must be taken that the ringing voltage, itself, does not inadvertently actuate the swiching network and remove the terminating impedance from the hybrid terminal set and reconnect the audio line to the hybrid during the ringing interval.

It is, therefore, one objective of this invention to provide a "ringdown" signalling arrangement for a communication circuit wherein the two-wire audio transmission path is automatically disconnected from the terminating set hybrid whenever the ringing voltage is applied.

A further objective of the invention is to provide a signalling arrangement for a communication system wherein the two-wire audio line is disconnected from the hybrid of a four-wire terminating set during signalling while maintaining hybrid balance.

Yet another objective of this invention is to provide a signalling arrangement for a communication system wherein the two-wire audio path is interrupted during signalling to prevent transmission of the ringing voltage while simultaneously maintaining hybrid balance in the terminating set to maintain acceptable return loss across the hybrid to eliminate feedback and singing in the output circuit.

Yet another objective of this invention is to provide an automatically-controlled terminating network for a communication system, wherein the audio line is electrically disconnected from the hybrid during signalling and a terminating impedance simultaneously switched across the hybrid to maintain hybrid balance during signalling.

Other objectives and advantages of the instant invention will become apparent as the description thereof proceeds.

These advantages and objectives are accomplished in one embodiment of the invention by providing a four-wire terminating set that includes a hybrid limiter-terminating circuit, which is electrically-controlled in response to the presence of a ringing voltage. It operates to disconnect the two-wire audio line from the hybrid, through a first set of switching diodes, and simultaneously to connect a suitable terminating impedance across the same set of hybrid terminals through another set of switching diodes. In this manner and by these means, the 20-cycle ringing voltage is blocked from the send circuit of the four-wire line while simultaneously maintaining the proper hybrid balance to prevent acoustic feedback and singing.

The various features of the invention, which are believed to be new and novel, are set forth with particularity in the appended claims. The invention, itself, however, may best be understood by reference to the following description, when taken in conjunction with the accompanying drawing in which:

Figure 1:
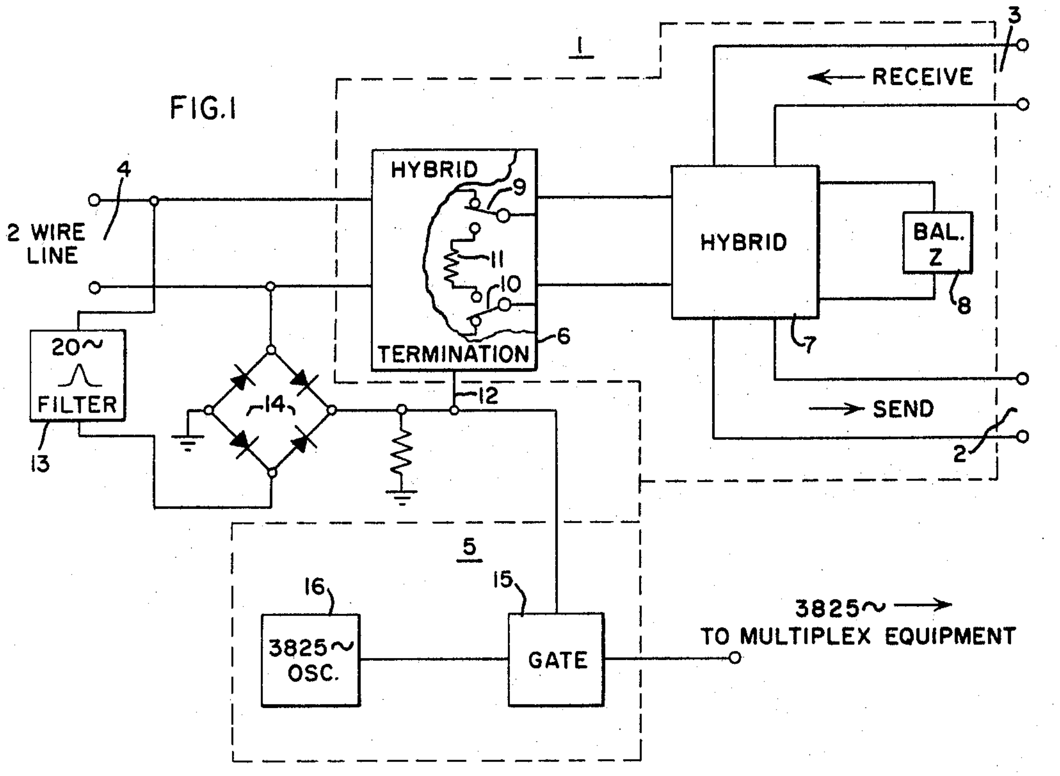
FIGURE 1 is a block diagram of the four-wire terminating set controlled by the ringing circuit.

FIGURE 1 illustrates, in block diagram form, a signalling arrangement which is characterized by the fact that the four-wire terminating set is electrically-controlled to prevent application of the ringing voltage to the four-wire send line, while simultaneously terminating its hybird with the proper impendance to maintain trans-hybird balance and return loss. The arrangement shown in FIGURE 1 includes a four-wire terminating set 1, which terminates the four-wire send and receive lines 2 and 3 in a two-wire duplex line 4 adapted for connection to a subscriber set or any other utilization circuit. A ringing circuit 5 is coupled to line 4 and to terminating set 1 and produces a 3825-cycle ringing signal in response to a 20-cycle ringing voltage from the subscriber set. The ringing signal may be injected into a separate transmission channel of a multiplex carrier system or directly into the send channel at the output of the four-wire termination set. The ringing circuit also controls, in a manner presently to be described, a hybrid limiter termination circuit 6, which disconnects the two-wire audio line from the termination set during signalling and connects a suitable impedance across its terminals.

The four-wire terminating set includes a hybrid 7, which may be a resistance or transformer hybrid of well-known construction. The hybrid contains four sets of terminals, one set connected to receive line 3, a further set connected to send line 2, a third set connected to the two-wire audio line 4, and a remaining set connected to a balancing impendance network 8. Network 8 may be a simple or complex network adjusted to simulate the impedance of two-wire line 4 to maintain the desired impedance match and eihance the isolation between send and receive lines 2 and 3. The hybrid limiter termination circuitry, illustrated schematically at 6, includes a pair of switching elements 9 and 10, which may be alternately connected to the two-wire line or to a terminating impedance 11. Switches 9 and 10 are illustrated, for the sake of simplicity, as simple mechanical switches operating between the sets of contacts. However, as will be explained in detail below, these switches are electrically-controlled in response to the appearance of the 20-cycle ringing voltage to disconnect the two-wire audio line from the hybrid, and to connect terminating impedance 11 to the hybrid whenever the ringing voltage appears. The switches in hybrid limiter termination circuit 6 are controlled by ringing circuitry 5 over line 12 whenever the 20-cycle ringing voltage is present.

The 20-cycle ringing voltage appearing over audio line 4 is passed through a 20-cycle filter 13 and converted to a DC voltage by a well-known rectifier bridge 14. A unidirectional voltage appears at the output of bridge 14 applied to a switching or gate circuit 15. A 3825-cycle ringing oscillator is connected to one input of gate 15 so that actuation of the gate by the control voltage causes a 3825-cycle ringing signal to be injected into one channel of the multiplex carrier equipment, or alternately into send channel 2. This 3825-cycle ringing signal is then transmitted to the remote called station in order to actuate its ringing circuitry.

The unidirectional voltage produced at the output of bridge 14 is, as was pointed out previously, also applied over lead 12 to the hybrid limiter termination circuit 6 to actuate switches 9 and 10 to disconnect the audio line from the four-wire terminating set and connect the balancing impedance across the output terminals of the hybrid in order to balance it during the ringing operation.

Figure 2:
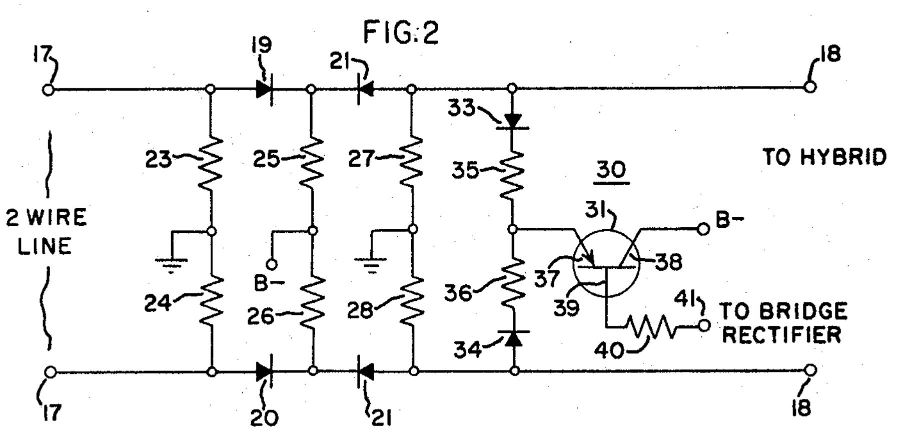
FIGURE 2 is a circuit diagram of the electrically-controlled limiter and termination circuitry.

FIGURE 2 is a circuit diagram illustrating one form of the hybrid limiter-termination circuitry for selectively connecting and disconnecting input terminals 17 of two-wire line 4 to one set of the hybrid output terminals shown at 18. Two pairs of oppositely poled, biased switching diodes 19–20 and 21–22, are connected in series between audio line terminals 17 and hybrid terminals 18. In the absence of ringing voltage, the diodes are conducting, thereby connecting the input audio terminals 17 to the hybrid terminals 18. Diodes 19–22 are biased into conduction by means of four voltage divider networks consisting of resistors 23–28. The junction of series connected resistors 23 and 24, 27 and 28 are connected to a point of reference potential, such as ground, and the junction of resistors 25 and 26 is connected to the negative terminal B— of a source of biasing potential. These resistances form voltage divider combinations between B— and ground, as follows: 23 and 25, and 27, 24 and 26, and 26 and 28. It will be apparent from observation that the pairs of oppositely-poled switching and limiting diodes 19–20 and 21–22 are biased into conduction since their cathodes are connected to the point of negative potential through resistances 25 and 26, whereas their respective anodes are connected to ground through resistance elements 23, 24, 27 and 28. With the diodes biased into conduction, the voice frequency or audio signals appearing at input terminals 17 are impressed on hybrid terminals 18 and, thence, to the send line 2. Similarly, audio signals from the receive line 3 are coupled to audio terminals 17. Diodes 19–22 also act as signal limiters or clippers to suppress high-level voice frequency signals with the limiting levels established by the diode biasing voltage. Under normal operating circumstances, with no ringing voltage present, this circuit arrangement functions as a normal biased diode limiter-clipper, with the peak current of the audio signal limited by the value of the diode biasing voltage.

A switching and control network 30 in connected across hybrid input terminals 18 to reverse bias diode switch elements 21 and 22 and disconnect input terminals 17 from hybrid terminal 18, thereby opening the two-wire audio line and disconnecting it from the hybrid during ringing. This network includes two further diode switches which are suitably biased during ringing to connect a terminating impedance across hybrid input terminals 18 to balance the hybrid and maintain the proper trans-hybrid conditions and hybrid return-loss conditions. Network 30 includes a transistor-control switch 31, which is actuated from bridge rectifier 14 to control a pair of diode switch elements 33 and 34, connected in series with hybrid-terminating resistors 35 and 36. Control transistor 31 is a PNP transistor, having an emitter 37 connected to the junction of resistors 35 and 36, a collector 38 connected to the negative terminal B— of a power supply, and a base 39, which is connected through a suitable current-limiting resistor 40 to the bridge rectifier terminal 41. In the absence of a 20-cycle ringing voltage, there is no output from the bridge rectifier and there is no negative voltage impressed on the base of the transistor, and the transistor is in the nonconducting state. The emitter-collector resistance of the transistor is very high, so that the potential at the junction or resistors 35 and 36 is close to ground. The cathodes of switching diodes 33 and 34 are, therefore, not sufficiently negative with respect to their anodes, which are also connected to ground through resistors 27 and 28, to bias diodes 33 and 34 into conduction. Resistors 35 and 36 are thus effectively disconnected from hybrid input terminals 18. The series switching diodes 19–22 remain forward biased; audio signals from the two-wire line terminals are transmitted with suitable peak limiting to the hybrid terminals 18, and audio from receive line 3 is similarly passed to terminals 17.

During ringdown signalling, the 20-cycle ringing voltage produces a negative control voltage at the bridge rectifier output and at base input terminal 41 which biases control transistor switch 31 into saturation. When transistor 31 is driven into saturation, the resistance of the emitter-collector path is very low, so that the voltage at junction of resistors 35 and 36 suddenly goes negative, and drops essentially to the value of the negative voltage at the B— terminal. The cathodes of diode switches 33 and 34 in series with these resistors are, therefore, suddenly more negative than their anodes, and diodes 33 and 34 are driven into conduction, connecting resistors 35 and 36 across the hybrid input terminals 18. Furthermore, when diodes 33 and 34 are forward-biased and start conducting, the current flow through resistances 27 and 28 increases. The voltage drop across resistors 27–28 (resistors which have substantially larger resistance value than the terminating resistors 35 and 36) is sufficiently great so that the voltage at the junctions of resistors 27 and 28 and the anodes of switching diodes 21 and 22 is now more negative than the voltage at the cathodes of these diodes. This biases diodes 21 and 22 into the nonconducting state, and disconnects input terminals 17 and the two-wire audio line from hybrid input terminals 18 and the line terminating set. Thus, the 20-cycle ringing voltage is blocked from the hybrid and the send line. It can be seen, therefore, that the two-wire audio line is electrically disconnected from the hybrid input, while at the same time connecting resistors 35 and 36 across the hybrid input terminals, which resistors are selected to terminate the hybrid properly and maintain trans-hybrid balance and adequate return-loss between the receive and send sides of the hybrid.

Although diodes 21 and 22 are reverse-biased during signalling in order to disconnect the audio line from the hybrid, diodes 19 and 20 remain in the conducting state and continue to function as limiters or clippers for the 20-cycle ringing voltage. This is to prevent high-level 20-cycle negative voltage alternations from overriding the reverse bias on diodes 21 and 22. That is, it is possible that a negative alternation of the 20-cycle ringing voltage might be of sufficiently high amplitude to exceed the reverse bias on the diodes and drive the cathodes of diodes 21 and 22 more negative than the anodes, thus inadvertently reconnecting the audio line to the hybrid while the 20-cycle ringing voltage is present. However, diodes 19 and 20 prevent this, since the amplitude of the 20-cycle ringing voltage cannot exceed the forward bias for diodes 19 and 20 without reverse-biasing these diodes and preventing the peaks from being applied to the cathodes of diodes 21 and 22. It will be seen, therefore, that the hybrid limiter termination circuitry illustrated in FIGURE 2 positively disconnects the two-wire audio line from the hybrid during "ringdown" conditions while simultaneously connecting a suitable terminating impedance across the hybrid terminals 18, which impedance provides suitable termination for the hybrid for AC signals.

One form of the hybrid limiter termination circuit illustrated in FIGURE 2 was constructed with the follow-component values. It will be appreciated, of course, that these are merely illustrative, and are not to be in any way considered as limiting the invention to these component values.

| | |
|---|---|
| Diodes **19–22**, **33** and **34** | 1N1695 |
| Resistors **23**, **24**, **27** and **28** | 6.19K ohms. |
| Resistors **25** and **26** | 4.64K ohms. |
| Resistors **35** and **36** | 300 ohms. |
| Resistor **41** | 22K ohms. |
| Transistor **31** | 2N2189-PNP transistor. |

While a particular embodiment of the invention has been described and shown, it will, of course, be understood that it is not limited thereto, since many modifications and variations in the method and the circuit arrangement for carrying out the invention may be made. It is contemplated that the appended claims cover any such modifications as fall within the true spirit and scope of this invention.

What is claimed as new and desired to be secured by Letters Patent of the United States is:

1. In a signalling arrangement the combination comprising, (A) a termination network adapted to be coupled between a two-wire signal transmission line and one set of terminals of a hybrid circuit for interconnecting the two-wire line with a four-wire line, said network including:

(1) a plurality of unidirectional conducting devices for connecting said line and said set of hybrid terminals.

(3) biasing means for biasing said devices into conduction to permit transmission of signals between said line and said hybrid terminals and for limiting the amplitude excursions of said signals.

(3) terminating impedance means, (4) a further bias means, (5) electrically-controlled switch means coupled to said impedance means and said further bias means for selectively connecting said impedance means across said terminals and to apply said further bias means to said unidirectional conducting devices.

(B) means responsive to a ringing frequency signal on said line for producing a control signal, and (C) means coupling said control signal to said switching means to actuate the switching means and bias said devices into non-conduction, thereby disconnecting said line from said hybrid terminals while simultaneously connecting said impedance across said terminals to terminate the hybrid properly with the line disconnected.

2. The signalling arrangement according to claim 1 wherein said electrically-controlled switch means comprise a plurality of solid-state devices.

3. The signallling arrangement according to claim 2 wherein said solid-state devices include at least two oppositely-poled diodes connected to opposite ends of said impedance.

4. The signalling network according to claim 1 wherein said electrically-controlled switch means includes a pair of diodes connected in series with said impedances, a normally open switch means coupled between said bias source and said diodes, said switch means being actuated in response to said control signal to apply said bias voltage to said diodes to cause them to become conductive and connect said impedance across the terminals and simultaneously bias said unidirectional devices into nonconduction.

5. The signalling network according to claim 4 wherein said normally open switch means comprises a transistor device.

6. The signalling system according to claim 1 which further includes a ringing generator means actuated in response to said control signal to produce an output therefrom.

7. The signalling system according to claim 1 wherein the unidirectional conducting devices consist of two opposed series connected diodes coupled between each wire of said two-wire line on one hybrid terminal and said bias means is connected to their junction to apply a voltage of suitable polarity to bias both of the oppositely-poled diodes into conduction.

8. The signalling system according to claim 7 wherein said switch means are connected to only one of each of said two series connected diodes to apply a biasing voltage thereto from said further bias means which is of a polarity such as overcomes the effect of the biasing means which normally biases the devices into conduction thereby driving one of said diodes into the non-conducting state to disconnect the line from the hybrid terminals.

No references cited.

KATHLEEN H. CLAFFY, *Primary Examiner.*

W. A. HELVESTINE, *Assistant Examiner.*

U.S. Cl. X.R.

179—16